United States Patent Office 3,074,746
Patented Jan. 22, 1963

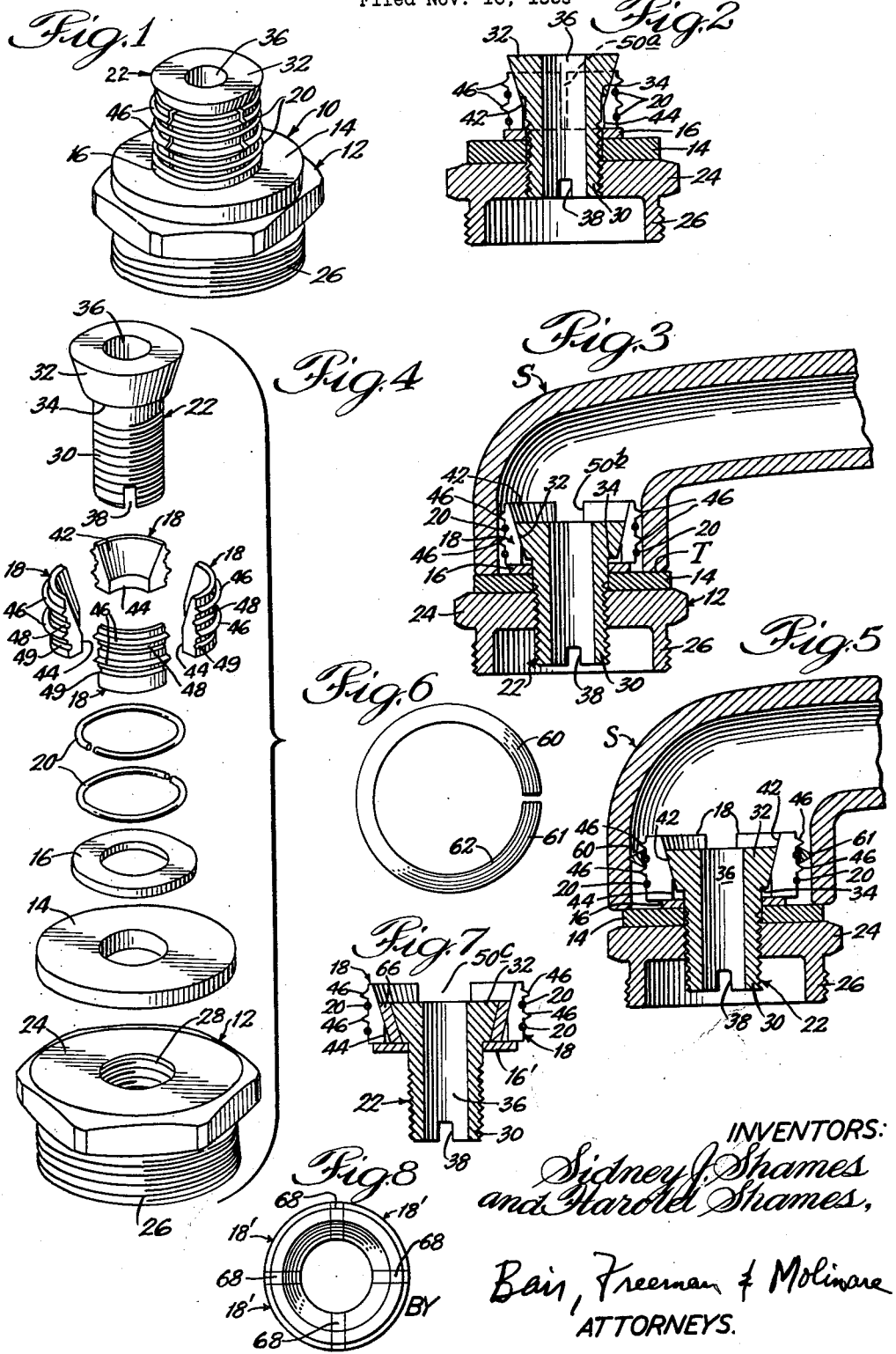

3,074,746
JAW-TYPE EXPANSION ADAPTER FOR
FLUID CONDUITS
Sidney J. Shames, 19 Agnes Circle, and Harold Shames,
5 Agnes Circle, both of Ardsley, N.Y.
Filed Nov. 16, 1959, Ser. No. 853,112
5 Claims. (Cl. 285—8)

This invention relates to an adapter for securing devices, such as aerators, washing machine hoses, dish washer hoses, and the like, to the discharge end of the spout through which liquid is supplied under pressure, and more particularly this invention relates to an improved internal adapter for a kitchen faucet spout or the like.

Many spout adapters have been devised in the past for retention to kitchen faucet spouts, and many of such adapters are adapted to grasp the outside of the faucet spout. However, from an aesthetic standpoint, the most desirable adapters are those which enter the spout and grip the spout on the inner periphery thereof. With regard to these internal type gripping adapters, there are two principal types of gripping that may be attained. One is by use of an elastic sleeve member which is selectively distortable into frictional, pressurized, gripping relation with the internal periphery of the faucet, and the other type involves the use of gripping elements which bite into the inner periphery of the faucet to effect gripping engagement therewith.

The most successful of the internal adapters which utilize a flexible sleeve that may be distorted into frictional, pressurized, gripping engagement with the interior periphery of the spout is that disclosed in Patent No. 2,721,089. The only objection to the adapter disclosed in said patent is that through continued use, and being subject to the high temperatures of hot water carried by the spout, the resilient sleeve of said adapter eventually deteriorates. Clearly, if a more permanent installation is desired, one must utilize gripping elements which would not tend to deteriorate with normal use, and such gripping elements are found in the second group of adapters wherein the gripping parts of the adapter are adapted to bite into the inner periphery of the faucet spout to provide an effective and non-deteriorating installation.

The instant invention is, accordingly, an improvement in the class of adapters wherein rigid gripping elements are utilized to bite into the inner periphery of a faucet spout or the like. In the said class of adapters to which this invention is directed, prior attempts have been made to provide adapters of this general type for the purpose intended. Two such prior attempts should be noted here to point up the disadvantages incident to such prior constructions. The first of such prior constructions provides a gripping bushing, or ring, of metal having a conical interior periphery against which a conical expander cam is adapted to operate, and said ring has a helically grooved outer periphery providing a plurality of helical teeth adapted for grippingly engaging the interior periphery of the spout. The said ring is axially slotted through its entire thickness and length at one point, thereby providing a split ring; and the ring is also partially axially slotted through its thickness diametrically of said through slot thereby weakening the ring's resistance to the expander cam. This existing device has a number of disadvantages including, first, that it requires appreciable force to expand the ring before gripping engagement will be obtained. Another disadvantage lies in the fact that the gripping ring may only be expanded a relatively small amount. A third objection lies in the fact that the ring when expanded will usually split at the point where it is weakened, thereby providing two segments of the gripping ring, and once the ring is split it is practically impossible to reassemble to use in another installation. Fourth, in order to provide the necessary weakness in the gripping bushing which will permit of expansion thereof, the rings are usually made of yellow brass which is softer than the red brass normally used for most faucet constructions, and this makes it difficult for the rings to properly dig into the interior periphery of the spout.

The second of the prior attempts to solve the problem which is here referred to provides a self-threading member made of hard metal and having a tapered outer periphery to permit of introduction of the smallest end of the adapter into the discharge end of the faucet, and then, by applying a wrench to the coupling, the conical threads on the coupling are caused to progressively bite into the inner periphery of the faucet, and continued tightening up by the wrench eventually effects a good gripping engagement with the faucet. The disadvantage with this latter device lies in the fact that a relatively very large force is required to tighten up the adapter, because a self-threading operation is not accomplished with small forces. A second disadvantage is that only a particular size adapter can be provided for a particular size spout, and therefore many different sizes of self-threading adapters must be provided at a retail outlet, so that the consumer may properly select the correct one for the spout to which he wishes to make an attachment. A third disadvantage is that in order to effect good self-threading, the material of the adapter is expensive, and the cost of such an adapter is relatively high. Still a further disadvantage lies in the fact that if the adapter is advanced too far into the spout, or if the spout happens to be a little weak, the spout may be split by the adapter, thereby causing substantial damage. And a further disadvantage is that said adapter does not properly perform its intended purpose when the spout to which it attaches is out of round, or oval, as is the case with many faucet spouts.

Accordingly, it is one object of the invention herein to provide a spout adapter of the general type that utilizes hard metal elements for biting into the inner periphery of the spout, and which avoids the disadvantages incident to the use of prior spout adapters as hereinabove noted.

Another object of this invention is to provide an improved spout adapter which: is of simple construction, of low cost, will work on faucets having oval internal peripheries, requires a relatively small force to install, and which provides for positive gripping of the faucet by the adapter.

A still further object of this invention is to provide a positive gripping internal faucet adapter wherein the hard gripping portions thereof are provided as separate segments which are resiliently held in an annular configuration, and which may be relatively easily expanded outwardly to effect the desired connections between the adapter and the inner periphery of the faucet spout.

With these and other objects in view, our invention consists in the construction, arrangement and combination of the various parts of our device whereby the objects contemplated are attained, as hereinafter more fully set forth, pointed out in our claims and illustrated in the accompanying drawings, wherein:

FIGURE 1 is a perspective view of an adapter constructed in accordance with this invention;

FIGURE 2 is an axial cross-section view of the device shown in FIGURE 1 and showing the jaw segments of the adapter in relatively non-expanded condition;

FIGURE 3 is similar to FIGURE 2 except that it shows the adapter of FIGURE 2 positioned within the discharge end of a faucet spout or the like, and shows the conduit gripping jaws in expanded gripping position;

FIGURE 4 is a perspective exploded view showing the various elements of the adapter of FIGURES 1 to 3;

FIGURE 5 is a view similar to FIGURE 3 and shows a modified form of adapter particularly useful with spouts having an unusually large discharge orifice;

FIGURE 6 is a plan view of the split ring that is employed in the form of the adapter device shown in FIGURE 5;

FIGURE 7 illustrates a portion of the device of FIGURES 1 to 4 and illustrates a modification that may be incorporated to effect enlargement of the operating range of the adapter of FIGURES 1 to 4; and FIGURE 8 shows still another modified form of a portion of the adapter device herein disclosed.

Referring now to the drawings, there is shown in FIGURE 1, in assembled form, an adapter generally indicated at 10 which embodies the invention. The adapter includes a nut member, generally indicated at 12, a resilient sealing washer 14, a rigid abutment washer 16, a plurality of jaw members 18, a pair of split resilient retaining rings 20, and a threaded ferrule 22.

The nut member 12 defines an annular plate portion 24 having a hexagonal outer periphery which provides means for securely holding the nut member 12 while the ferrule 22 is rotated relative thereto. Although the outer periphery of plate portion 24 is shown hexagonal, the periphery could be round and knurled to provide gripping means for holding the nut member 12. Extending downwardly from the plate portion 24 is a sleeve portion 26 which may be threaded, for example, externally to receive a female threaded aerator or the like. The plate 24 is provided with a central threaded bore 28.

The ferrule, or stem means, 22 has an elongated threaded stem portion 30 and an enlarged, frusto-conical, camming or expander portion 32, the smaller end of which terminates in a shoulder 34 adjacent stem 30 and the larger end of the expander portion being at the upper terminal end of ferrule 22. The central longitudinal bore of ferrule 22 is indicated at 36. The lowermost end of stem 30 is slotted diametrically at 38 to provide means at said end of the ferrule for cooperation with a tool which would be utilized to effect advancement of stem 30 through bore 28, to effect expansion of the jaw members in the manner as illustrated by FIGURES 2 and 3, and as hereinafter described.

The jaw members 18 are each similar and separate from the other jaw members and each is provided with an upper, conical, inner peripheral, camming surface, portion 42 and a lower, cylindrical peripheral portion 44. The outer periphery of each jaw member 18 is provided with a plurality of spaced arcuate ridges 46 and at least one depressed ring-retaining arcuate recess 48. In the preferred form shown, two such ring recesses 48 and 49 are shown each adapted to seat a portion of a retainer ring 20 therein; and one of the ring recesses 48 is located axially between the pair of spaced ridges 46 and is located radially outwardly of said conical periphery 42 of the jaw member.

In order to obtain the desired operation of the adapter, a plurality of jaw segments 18 should be provided. In the preferred form shown herein four jaw segments 18 of an arcuate length of no more than 90° are utilized, and it has been found that the use of four jaw segments accomplishes excellent results.

In the assembled adapter, the four jaw segments 18 are resiliently biased against the inclined wall of frusto-conical portion 32 of stem means 22 with the conical inner peripheral portions 42 of said jaw members abutting thereagainst. The split resilient rings 20, while relatively easily spread, are lodged in the ring recesses 48 and 49 to embrace portions of the outer periphery of each jaw members 18 and operate to bias the jaw members 18 radially inwardly against the ferrule 22, so that the ring members 20 cooperating with the ferrule 22 effects the maintaining of the jaw segments 18 in an annular configuration. While two rings 20 are shown used, it is possible to utilize a single retaining ring 20, and in such a case the single ring should be located in groove 48, between the ridges 46 and radially outwardly of the conical surface portions 42.

In the use of the adapter here disclosed reference is had to FIGURE 3 which shows a typical faucet spout S having a terminal edge T and which spout is adapted to supply water under pressure. The adapter 10, when in the condition shown in FIGURE 2, is introduced through the discharge outlet of the spout S. It will be seen that the dimension of the gasket means 14 is so selected that the largest dimension of gasket 14 is greater than the interior dimension of the spout S to which the adapter is to connect. The plate portion 24 is also larger than the interior dimension of the spout S, thereby providing that the peripheral edge of plate portion 24 may be firmly held while the ferrule 22 is advanced from the position shown in FIGURE 2 to the position shown in FIGURE 3 and also providing that gasket 14 will not enter spout S and will be clamped between plate 24 and spout terminus T. The rigid washer 16, on the other hand, is selected of a dimension such that it is smaller than the inner periphery of the spout orifice, so that the washer 16, and the expander portions of the adapter thereabove, all enter the discharge end of the spout.

With the adapter held in stationary position in the discharge end of the spout S, the ferrule 22 may have its lower end engaged by an advancing tool, such as a coin or the bit of a screwdriver, and by rotating the ferrule counterclockwise while the nut 12 is held against rotation by hand or by a tool, the threads on ferrule 22 coacting with the threads in bore 28 cooperate to advance the ferrule from the position shown in FIGURE 2 to the position shown in FIGURE 3. This causes the cam actuator 32 to advance axially of the jaw members 18 toward plate 24 and this in turn causes the jaw members 18 to move radially outwardly against the resilient bias of the split ring members 20 until the ridges 46 bite into, and grippingly engage, the inner periphery of the spout S, as shown in FIGURE 3. A portion of the force transmitted from ferrule 22 to jaw members 18 is transmitted axially of said jaw members against the rigid washer 16 against which the jaw members abut, and this axial force on washer 16 is, in turn, transmitted to the resilient washer 14, thereby causing the gasket means 14 to compress and to effect a seal between itself and the stem 30 of ferrule 22 while the nut 12 is, at the same time, forced toward the terminal edge T of the spout to effect the seal between the gasket means 14 and the spout S and between the gasket means 14 and the nut member 12. The amount of expansion of jaws 18 achieved is best seen by comparing the spacing of edges of the adjacent jaw segments 18, as shown at 50a in FIGURE 2, with the spacing illustrated at 50b in FIGURE 3. To release the adapter, the ferrule 30 is rotated, while nut 12 is held, in the direction to move actuator 32 away from plate 24, and the bias of rings 20 restores the portion of jaw members 18 radially inwardly. In order to effect the maximum sealing, after the jaws 18 have been expanded into gripping engagement with the spout S, then one should rotate the nut 12 to advance it upwardly along stem 30 to more tightly clamp the sealing washer 14 outwardly of washer 16 between plate portion 24 and the terminus T of the spout.

In the modified form shown in FIGURES 5 and 6, the adapter provided is the same as that shown in FIGURES 1 and 3 with the addition of an enlarging, relatively heavy split ring member 60 of generally triangular cross section which is of an arcuate length to embrace a portion of each of the jaw segments 18, and with the inner periphery 62 of said ring made concave to provide clearance between the ring 60 and the retaining ring 20 positioned therebeneath. The ring 60 provides a sharp, substantially circular gripping edge 61 positioned outwardly of the outermost peripheral portions of the jaw members 18. The base width of the ring 60 is such as to fit snugly between the bases of the ridges 46 formed on the outer periphery of the jaw members, thereby providing means for locating and retaining the split ring 60 relative to the jaw segments 18. It will be understood that the maximum operating size of the adapter is increased by the addition of the split ring 60; and the jaw segments 18, when they are expanded radially effect expansion of the split ring 60, and the greater outer periphery of ring 60 provides for use of the adapter with conduits of a greater internal periphery than conduits such as shown in FIGURE 3.

In the modified form shown in FIGURE 7, in order to provide for use of the adapter with conduits having greater discharge orifices than that shown in FIGURE 3, there is provided a rigid washer 16' of enlarged dimension for engagement with an enlarged sealing washer (not shown), and there is also provided a cam-enlarging, frusto-conical, annular ring 66 which is located between the cam actuator 32 and the inner conical periphery of the jaw segments 18. The fact that the device of FIGURE 7 may be used in larger spout orifices is illustrated by the spacing of adjacent edges of jaw members 18, as illustrated at 50c in FIGURE 7.

In the modified construction shown in FIGURE 8, the four jaw segments 18', rather than being retained in an annular configuration by split rings 20, are retained in an annular configuration by each pair of adjacent segments 18' being bonded together between their adjacent edges by a resilient stretchable means 68, such as rubber or the like, and the inner periphery of means 68 conforms with the inner periphery of jaw segments 18' so as to provide a regular internal periphery. In the device of FIGURE 8, the jaw segments 18' together with the stretchable parts 68 bonded thereto, provide that the jaw segments 18' are automatically retained in annular configuration and present a unitary, continuous and expandable ring. A unitary ring shown in FIGURE 8 could be utilized with the ferrule 22 and other parts of the adapter without having to use the retaining rings 20.

The jaw segments 18 are formed of relatively hard steel so that the ridges 46 thereon will bite into the relatively softer brass of the faucet spout S to effect a superior gripping of the spout S. The ridges 46 are formed very sharp with a vertex angle of about 60 degrees. The adapter device herein is particularly useful with internally threaded faucet spouts, because the ridges 46 will enter between threads on the spout and effect a proper connection, and the jaw segments 18 being of relatively small arcuate length adjust themselves to the helical threads in an internally threaded spout. An adapter of the type generally disclosed herein is particularly useful for effecting good connection with the inner wall of a non-round or oval spout. In the latter situation, the use of only two or three jaw segments 18 permits accommodation of the adapter to the non-round inner periphery of the spout.

Some changes may be made in the construction and arrangement of the parts of our device without departing from the real spirit and purpose of our invention, and it is our intention to cover by our claims any modified forms of structure or use of mechanical equivalents which may be reasonably included within their scope.

We claim as our invention:

1. An adapter for internal attachment to fluid conduits adapted to carry fluids under pressure; said adapter comprising, in combination: conduit-gripping means comprising a plurality of arcuate jaw segments each being separate from the other jaw segments and each providing exterior gripping teeth thereon adapted to engage and grip the interior of a conduit, and each jaw segment having an inner camming surface; means for maintaining the jaw segments in an annular configuration, said means including elongated tubular stem means adapted for conveying fluid therethrough and having a portion thereof engaging portions of the inner periphery of each said jaw segments to permit of slidable rotation between the stem means and the jaw segments, and resilient means engaging each of said jaw segments and resiliently biasing said jaw segments radially inwardly against said stem means; and expander means for selectively causing the jaw segments to move radially outwardly against said radially inward bias to cause the gripping teeth on said jaw segments to grippingly engage the inner periphery of a conduit to which the adapter is to connect; said expander means comprising an annular plate whose maximum dimension is greater than the interior dimension of a conduit to which the adapter is to connect, so that said annular plate will not enter said conduit, a cam actuator on said stem means having a continuous surface adapted for cooperation with the camming surfaces on said jaw members, and advancing means coacting between said stem means and said annular plate for selectively effecting relative axial movement between said jaw segments and said cam-actuator, and annular sealing gasket means surrounding said stem means and positioned adjacent said annular plate, said gasket means adapted to be compressed to effect a seal between itself and each of said conduit, plate, and stem means, and a rigid ring of smaller dimension than the interior dimension of a conduit positioned between said gasket means and said jaw segments with said jaw segments abutting said rigid ring and adapted to slide radially of said rigid ring while said jaw segments are spaced from said gasket means so as to prevent engagement of the gasket means by said radially movable jaw segments.

2. An adapter for internal attachment to fluid conduits adapted to carry fluids under pressure; said adapter comprising, in combination: conduit-gripping means comprising a plurality of arcuate jaw segments each being separate from the other jaw segments and each providing exterior gripping teeth thereon adapted to engage and grip the interior of a conduit, and each jaw segment having an inner camming surface; means for maintaining the jaw segments in an annular configuration, said means including elongated tubular stem means adapted for conveying fluid therethrough and having a portion thereof engaging portions of the inner periphery of each said jaw segments to permit of slidable rotation between the stem means and the jaw segments, and resilient means engaging each of said jaw segments and resiliently biasing said jaw segments radially inwardly against said stem means; and expander means for selectively causing the jaw segments to move radially outwardly against said radially inward bias to cause the gripping teeth on said jaw segments to grippingly engage the inner periphery of a conduit to which the adapter is to connect, said expander means comprising an annular plate whose maximum dimension is greater than the interior dimension of a conduit to which the adapter is to connect, so that said annular plate will not enter said conduit, a frusto-conical cam-actuator on said stem means spaced from said plate and having a continuous surface adapted for cooperation with the camming surfaces of said jaw members, said stem means being screw-threaded in the central aperture of said plate and having means therein for selectively moving the cam-actuator axially toward and away from said plate, said jaw segments being positioned between the cam-actuator on the stem means and said plate, to restrain axial movement of said jaw members relative to said plate, annular gasket means of greater dimension than the interior of a conduit positioned against said plate and adapted to be compressed into sealing engagement with each of the conduit, the plate and the stem means as the adapter is being secured to the conduit, and a rigid washer of smaller dimension than the interior dimension of a conduit positioned between the jaw segments and the gasket means and having said jaw segments abut thereagainst so as to permit radial sliding of the jaw segments relative to said rigid washer without said jaw segments engaging said gasket means.

3. An adapter for internal attachment to fluid conduits adapted to carry fluids under pressure; said adapter comprising, in combination: conduit-gripping means comprising a plurality of arcuate jaw segments each being separate from the other jaw segments and each providing exterior gripping teeth thereon adapted to engage and grip the interior of a conduit, and each jaw segment having an inner camming surface; means for maintaining the jaw segments in an annular configuration, said means including elongated tubular stem means adapted for conveying fluid therethrough and having a portion thereof engaging portions of each said jaw segments in a manner to permit of rotation of the stem means relative to said jaw segments, and resilient means engaging each of said jaw segments and resiliently biasing said jaw segments radially inwardly against said stem means; and expander means for selectively causing the jaw segments to move radially outwardly against said radially inward bias to cause the gripping teeth on said jaw segments to grippingly engage the inner periphery of a conduit to which the adapter is to connect, said expander means comprising an annular plate whose maximum dimension is greater than the interior dimension of a conduit to which the adapter is to connect, so that said annular plate will not enter said conduit, annular gasket means surrounding said tubular stem means and positioned adjacent said plate and adapted to be compressed into sealing engagement with each of the conduit, the plate and the stem means as the adapter is being secured to the conduit, a rigid annular member of smaller dimension than the interior dimension of a conduit spaced from said annular plate and positioned between the jaw segments and the gasket means and having said jaw segments abut thereagainst so as to permit radial sliding of the jaw segments relative to said rigid annular member without said jaw segments engaging said gasket means, a continuous frusto-conical cam-actuator surface on one of said parts which engages jaw segments adapted for cooperation with the camming surfaces of said jaw members, and said tubular stem means being screw-threaded in the central aperture of said plate so as to be rotatable with respect thereto and with respect to said jaw segments and having means therein for selectively effecting relative axial movement between said jaw segments and said cam-actuator.

4. An adapter for internal attachment to fluid conduits adapted to carry fluids under pressure; said adapter comprising, in combination: conduit-gripping means comprising a plurality of arcuate jaw segments each being separate from the other jaw segments and each providing exterior gripping teeth thereon adapted to engage and grip the interior of a conduit, and each jaw segment having an inner camming surface; means for maintaining the jaw segments in an annular configuration, said means including elongated tubular stem means adapted for conveying fluid therethrough and having a portion thereof engaging portions of each said jaw segments in a manner to permit of rotation of the stem means relative to said jaw segments, and resilient means engaging each of said jaw segments and resiliently biasing said jaw segments radially inwardly against said stem means; and expander means for selectively causing the jaw segments to move radially outwardly against said radially inward bias to cause the gripping teeth on said jaw segments to grippingly engage the inner periphery of a conduit to which the adapter is to connect, said expander means including a rigid ring slidably mounted on said stem means and engaging said jaw segments, cam-actuator means, on one of said parts which engage said jaw segments, having a continuous surface and positioned to move against the camming surfaces on said jaw members, an annular plate threaded to said stem means and spaced from said jaw segments, a gasket on said stem means between said ring and said annular plate adapted to be compressed into sealing engagement with each of said conduit, ring, and annular plate, and the rigid ring against which said jaw segments abut permitting radial sliding of the jaw segments relative to said ring without said jaw segments engaging said gasket.

5. A device as set forth in claim 3 wherein a portion of the gasket means is located circumferentially outwardly of said rigid annular member and outwardly of said jaw segments and is arranged to be disposed axially between the terminus of the conduit and said annular plate for clamping therebetween.

References Cited in the file of this patent

UNITED STATES PATENTS

| | | |
|---|---|---|
| 1,352,494 | Zifferen | Sept. 14, 1920 |
| 1,604,762 | Slocum | Oct. 26, 1926 |
| 2,104,180 | Barker | Jan. 4, 1938 |
| 2,377,077 | Gay et al. | May 29, 1945 |
| 2,493,556 | Stone | Jan. 3, 1950 |
| 2,721,089 | Shames | Oct. 18, 1955 |
| 2,926,026 | Matteson | Feb. 23, 1960 |